(12) United States Patent
Karapantelakis et al.

(10) Patent No.: US 10,885,773 B2
(45) Date of Patent: Jan. 5, 2021

(54) TECHNIQUE FOR COLLECTING INFORMATION RELATED TO TRAFFIC ACCIDENTS

(71) Applicant: Telefonaktiebolaget LM Ericsson (publ), Stockholm (SE)

(72) Inventors: Athanasios Karapantelakis, Stockholm (SE); Gábor Stikkel, Sollentuna (SE); Konstantinos Vandikas, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/781,981

(22) PCT Filed: Dec. 10, 2015

(86) PCT No.: PCT/SE2015/051324
§ 371 (c)(1),
(2) Date: Jun. 6, 2018

(87) PCT Pub. No.: WO2017/099642
PCT Pub. Date: Jun. 15, 2017

(65) Prior Publication Data
US 2018/0365983 A1    Dec. 20, 2018

(51) Int. Cl.
*G06F 15/173* (2006.01)
*G08G 1/01* (2006.01)
(Continued)

(52) U.S. Cl.
CPC ............... *G08G 1/012* (2013.01); *G07C 5/08* (2013.01); *G07C 5/085* (2013.01); *G08G 1/0112* (2013.01);
(Continued)

(58) Field of Classification Search
CPC ...... G08G 1/012; G08G 1/205; G08G 1/0112; G08G 1/0116; G08G 1/0133; G08G 1/091;
(Continued)

(56) References Cited

U.S. PATENT DOCUMENTS 9,505,494 B1 * 11/2016 Marlow ............... B64C 39/024
10,102,586 B1 * 10/2018 Marlow ............... G06Q 40/08
(Continued)

FOREIGN PATENT DOCUMENTS

KR    20130108928 A    10/2013
WO    2014193282 A1    12/2014

OTHER PUBLICATIONS

International Search Report and Written Opinion dated Sep. 9, 2016 for International Application No. PCT/SE2015/051324 filed on Dec. 10, 2015, consisting of 15-pages.
(Continued)

*Primary Examiner* — Masud Ahmed
(74) *Attorney, Agent, or Firm* — Christopher & Weisberg, P.A.

(57) ABSTRACT

The present invention relates to methods and devices for collecting information related to traffic accidents. A method in a first electronic sensor device involves the detection of a traffic accident, retrieving information regarding available other electronic sensor devices at the location of the traffic accident, and activating at least one of the available other electronic sensor devices to send any traffic accident data recorded at the time for the traffic accident to a traffic information service. According to a method in a traffic information service node, the method includes receiving a traffic accident alert message from an electronic sensor device, retrieving information regarding available electronic sensor devices at the location of the traffic accident, acti-
(Continued)

vating at least one of the available electronic sensor devices to send any recorded traffic accident data and receiving, organizing and storing the traffic accident data.

14 Claims, 11 Drawing Sheets

(51) Int. Cl.
| | |
|---|---|
| *G08G 1/00* | (2006.01) |
| *H04W 4/38* | (2018.01) |
| *G07C 5/08* | (2006.01) |
| *H04W 4/90* | (2018.01) |
| *H04W 4/44* | (2018.01) |
| *G08G 1/09* | (2006.01) |
| *H04L 29/06* | (2006.01) |

(52) U.S. Cl.
CPC ......... *G08G 1/0116* (2013.01); *G08G 1/0133* (2013.01); *G08G 1/205* (2013.01); *H04W 4/38* (2018.02); *H04W 4/44* (2018.02); *H04W 4/90* (2018.02); *G08G 1/091* (2013.01); *H04L 63/0428* (2013.01); *H04L 2209/80* (2013.01); *H04L 2209/84* (2013.01)

(58) Field of Classification Search
CPC   H04W 4/38; H04W 4/90; H04W 4/44; G07C 5/08; G07C 5/085; H04L 63/0428; H04L 2209/80; H04L 2209/84
USPC ........................................................... 701/51
See application file for complete search history.

(56) References Cited

U.S. PATENT DOCUMENTS

| | | | | |
|---|---|---|---|---|
| 2009/0105902 | A1* | 4/2009 | Choi ..................... | G08G 1/162 701/33.4 |
| 2013/0086109 | A1* | 4/2013 | Huang .................. | G06F 16/487 707/770 |
| 2013/0141247 | A1* | 6/2013 | Ricci ....................... | H04W 4/90 340/870.01 |
| 2013/0151088 | A1* | 6/2013 | Ricci ....................... | G06F 17/00 701/51 |
| 2013/0311641 | A1* | 11/2013 | Chow ..................... | G08G 1/04 709/224 |
| 2014/0232564 | A1* | 8/2014 | Garay ................... | G08G 1/0116 340/934 |
| 2015/0112543 | A1* | 4/2015 | Binion ................ | G06F 17/5095 701/32.2 |
| 2015/0145695 | A1 | 5/2015 | Hyde et al. | |
| 2017/0006132 | A1* | 1/2017 | Sorenson, III .......... | H04L 67/28 |
| 2018/0091391 | A1* | 3/2018 | Turow .................. | H04L 43/045 |
| 2018/0091621 | A1* | 3/2018 | Kuo ...................... | H04L 67/327 |

OTHER PUBLICATIONS

ECall: Time saved = lives saved; Digital Agenda for Europe; European Commission; A Europe 2020 Initiative; Last updated Feb. 23, 2015; retrieved on Jun. 26, 2015; http://ec.europa.eu/digital-agenda/ecall-time-saved-lives-saved, consisting of 1-page.
European Search Report for Application No. 1590324.1, dated Jul. 22, 2019, Consisting of 8 pages.

* cited by examiner

TECHNIQUE FOR COLLECTING INFORMATION RELATED TO TRAFFIC ACCIDENTS

CROSS-REFERENCE TO RELATED APPLICATIONS

This application is a Submission Under 35 U.S.C. § 371 for U.S. National Stage Patent Application of International Application Number: PCT/SE2015/051324, filed Dec. 10, 2015 entitled "TECHNIQUE FOR COLLECTING INFORMATION RELATED TO TRAFFIC ACCIDENTS," the entirety of which is incorporated herein by reference.

TECHNICAL FIELD

The present technology relates to methods and devices in a wireless communication network, especially methods, a service device, a node, computer program, computer program product and carrier for collecting information related to traffic accidents involving at least one vehicle.

BACKGROUND

As more and more people are using vehicles, the probability of accidents is increasing.

A mobile telecommunication service called "eCall" shall be launched in Europe with the purpose to bring rapid assistance to motorists involved in a collision anywhere in the European Union.

In case of a crash, an eCall-equipped car automatically calls the nearest emergency centre. Even if no passenger is able to speak, e.g. due to injuries, a 'Minimum Set of Data' is sent, which includes the exact location of the crash site. Shortly after the accident, emergency services therefore know that there has been an accident, and where exactly.

The "eCall" service cuts emergency services response time. It goes down to 50% in the countryside and 60% in built-up areas. The quicker response will save hundreds of lives in the EU every year. The severity of injuries will be considerably reduced in tens of thousands of cases. An eCall is made by pushing a button inside the car. A person witnessing an accident, pushes the eCall-button for reporting the accident and automatically give the precise location. As eCall normally 'sleeps', it does not allow vehicle tracking outside emergencies.

In the event of a serious accident, eCall automatically dials 112—Europe's single emergency number.

If an accident occurs it is crucial to identify who is responsible for the accident so that the vehicles involved can be removed from the road as soon as possible to avoid traffic jams. There are cases when the drivers do not agree on the responsibility. In such cases and in most countries the police are involved to support identification of the responsible driver. This can be a time-consuming process that could lead to traffic jams if the vehicles cannot be removed from the roads. Furthermore, this process can be further obscured by uncertainty when there is not enough information about the conditions surrounding the incident. Additionally, this process may involve extra costs of dispatching police investigators to the scene of the accident as well as experts from insurance companies.

SUMMARY

One object with the following disclosure is to present a technology for collecting information that can be helpful for determining the causes before, during and after the accident has occurred. The amount of sensors installed on vehicles and in the road infrastructure increases. Some of said sensors maybe used for collecting useful information when trying to inspect the scene of an incident or accident. The plethora of these different sources poses a challenge and a problem regarding the collection of all possible information that can be used later on to generate and reconstruct a complete view of the incident. The following technology presented herein provides a solution for finding and collecting traffic accident information from electronic sensor devices at the location of the traffic accident and in its surrounding area.

According to one aspect, a first method and embodiments thereof are provided. The first method is performed in a first electronic sensor device. It is a method for collecting information related to traffic accidents involving at least one vehicle. Said method comprises detecting a traffic accident, retrieving information regarding available other electronic sensor devices at the location of the traffic accident and in its surrounding area. It further comprises to activate at least one of said available other electronic sensor devices to send any traffic accident data recorded at a time interval comprising the time for the traffic accident to a traffic information service, and sending to the traffic information service traffic accident data recorded by the first electronic sensor device at the time interval comprising the time for the traffic accident.

According to further one aspect, a second method in a traffic information service and embodiments of the method are provided. Said method is a method for collecting information related to traffic accidents involving at least one vehicle. Said method comprises to receive of a traffic accident alert message from an electronic sensor device wherein the traffic accident alert message indicates the geographical location and the time of the traffic accident, and to retrieve information regarding available electronic sensor devices at the location of the traffic accident and its surrounding area. The method further comprises to activate at least one of said available electronic sensor devices to send any traffic accident data recorded at a time interval comprising the time for the traffic accident to the traffic information service, and to receive, organize and store any traffic accident data recorded at the time interval comprising the time for the traffic accident.

According to further one aspect, a first electronic sensor device and embodiments of the device are provided. Said first electronic sensor device comprises a processor in a processing circuitry which is operating to perform the steps of the first method for collecting information related to traffic accidents involving at least one vehicle.

According to yet one aspect, a first electronic sensor device and embodiments thereof are provided for collecting information related to traffic accidents involving at least one vehicle. Said device comprises a trigger unit adapted to detect a traffic accident, a radio interface adapted to retrieve information regarding available other electronic sensor devices at the location of the traffic accident and in its surrounding area, an activator unit adapted to activate at least one of said available other electronic sensor devices to send any traffic accident data recorded at a time interval comprising the time for the traffic accident to a traffic information service; and wherein the radio interface is adapted to send, to the traffic information service, the traffic accident data recorded by the first electronic service device at the time interval comprising the time for the traffic accident.

According to yet one aspect, a traffic information service node and embodiments of the service node are provided. Said traffic information service node comprises a processor in a processing circuitry being operated to perform the steps of the second method for collecting information related to traffic accidents involving at least one vehicle.

According to yet one aspect, a traffic information service node and embodiments of the service node are provided for collecting information related to traffic accidents involving at least one vehicle. Said node comprises an alert unit adapted to receive a traffic accident alert message from an electronic sensor device wherein the traffic accident alert message indicates the geographical location and the time of the traffic accident, and a reading unit adapted to retrieving information regarding available electronic sensor devices at the location of the traffic accident and its surrounding area. The service node further comprises an activator unit adapted to activate at least one of said available electronic sensor devices to send any traffic accident data recorded at a time interval comprising the time for the traffic accident to the traffic information service and an accident data handler adapted to receive, organize and store any traffic accident data recorded at a time interval comprising the time for the traffic accident.

According to further one aspect, a computer program is provided. Said computer program comprises computer program code which, when run in a processor circuitry of a first electronic sensor device, causes the first electronic sensor device to perform steps of the first method and embodiments thereof.

According to further one aspect, a computer program product is provided, which comprises a computer program and a computer readable means, which the computer program is stored. Said computer program comprises computer program code which, when run in a processor circuitry of a first electronic sensor device, causes the first electronic sensor device to perform steps of the first method and embodiments thereof.

According to yet one aspect, a carrier containing a computer program, wherein the carrier is one of an electronic signal, optical signal, radio signal or computer readable storage medium. Said computer program comprises computer program code which, when run in a processor circuitry of a first electronic sensor device, causes the first electronic sensor device to perform steps of the first method and embodiments thereof.

According to further one aspect, a computer program is provided. Said computer program comprising computer program code which, when run in a processor circuitry of a traffic service information node, causes the node to perform steps of the second method.

According to further one aspect, a computer program product, which comprises a computer program and a computer readable means on which the computer program is stored. Said computer program comprising computer program code which, when run in a processor circuitry of a traffic service information node, causes the node to perform steps of the second method.

According to further one aspect, a carrier containing a computer program, wherein the carrier is one of an electronic signal, optical signal, radio signal or computer readable storage medium. Said computer program comprising computer program code which, when run in a processor circuitry of a traffic service information node, causes the node to perform steps of the second method.

The proposed solution automates the data collection process end-to-end hence no manual steps are necessary. Therefore the incident resolution time can be reduced, i.e. duration of traffic jams can potentially decrease.

Additionally, the operational expenses related to gathering data from the accident scene are reduced significantly as physical presence of investigators from insurance agencies and police in the area to gather evidence.

Finally, this solution may indirectly benefit emergency response agencies (e.g. hospitals or clinics, police, fire brigade) response times and effectiveness of said response, by promptly informing those agencies not only about the cause of the accident, but also the severity which may directly or indirectly hint to the situation of the vehicle occupants.

BRIEF DESCRIPTION OF THE DRAWINGS

The foregoing, and other, objects, features and advantages of the present technique will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present technique. However, it will be apparent to one skilled in the art that the present technique may be practiced in other embodiments that depart from these specific details. In other instances, detailed descriptions of well-known methods, devices, and circuits are omitted so as not to obscure the description of the present technique with unnecessary detail.

Figure 1:
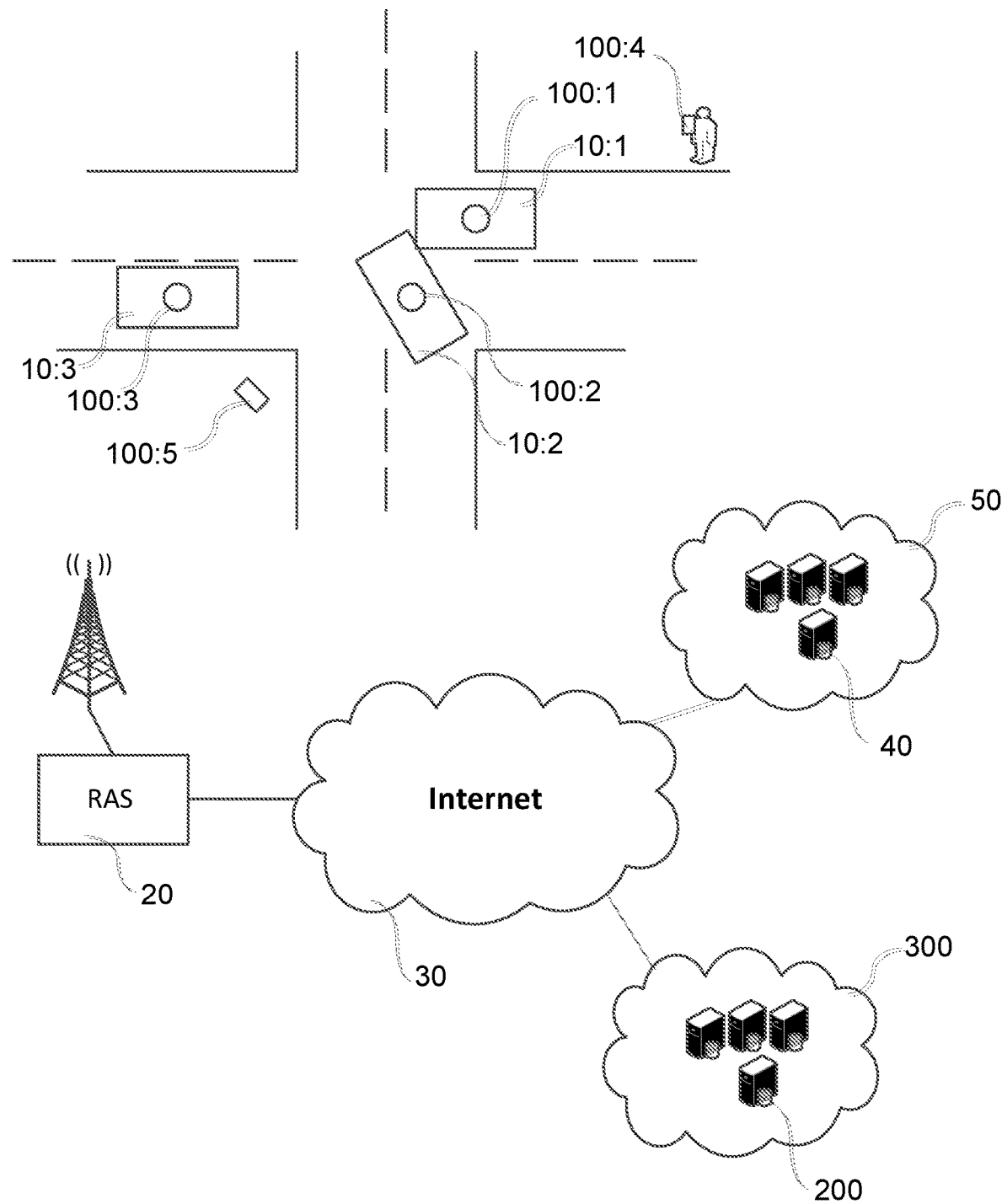
FIG. 1 is a block diagram of an exemplary network in which systems and methods described herein may be implemented.

FIG. 1 is a block diagram of an exemplary network in which systems and methods described herein may be implemented. The system makes use of available electronic sensor devices 100 adapted for registering and collecting information related to traffic accidents involving at least one vehicle 10.

Information related to traffic accidents may be a wide range of parameters depending on what the electronic sensor is adapted to register. Said electronic sensor devices comprise at least one of a data recording device, a temperature sensor, a traffic sensor, and a vehicle performance sensor. Speed before the accident, time for the accident, traffic intensity, weather and light conditions are a number of such data information that are of interest at an investigation of a traffic accident. The traffic accident data sent to a traffic information service is often defined as vehicle dynamics information and/or contextual information.

Example of vehicle dynamics information may be:
Number of vehicles involved in the accident;
Involved vehicle category, which defines in more detail the type of vehicle: car, lorry, buss, etc.;
Speed, direction of travel of involved vehicles prior to accident;
Involved vehicle service history and current service interval (e.g. km remaining before service, service interval excess, etc.);
Involved vehicle status (tire pressure, condition of brakes, etc.);
Direction in case the traffic in opposite directions is separated in separated lanes;
Number of people per vehicle including the driver of the vehicle.
Example of contextual information:
Weather conditions, such as temperature, humidity, luminosity, wind speed, wind direction, precipitation, etc.;
Location Information, e.g. coordinates, Geographic Information System (GIS) map including terrain elevation;
Time of the accident;
Traffic authority Information, e.g. speed limit, roadworks, etc.
Surveillance resources: e.g. cameras both at the location for the accident and in locations before and after the location for the accident;
Witnesses: people outside the accident, located e.g. from mobile phone signatures.

The electronic sensor devices 100 may be located at different locations. As illustrated, some of the electronic sensor devices 100 are situated in vehicles as devices indicated 100:1, 100:2, and 100:3. One electronic sensor device 100:4 is carried by a person and another electronic sensor device 100:5 is fixedly located at the road-crossing, e.g. as a road surveillance device 100:3.

Vehicles 10 are often provided with different electronic sensors which collect different data information regarding the performance of the vehicle, the drive's behaviour, number of passengers, etc. The electronic sensor device 100:4 carried by a person may be a user device such as a smartphone, mobile telephone, surf plate, etc. Such devices are often provided with an electronic camera and a radio transceiver for connection to the Internet 30 via a Radio Access System (RAS) 20 comprising a core network connected to a radio base station (RBS), or a IEEE 802.11x-based access point and Internet Service Provider (ISP). The fixed electronic sensor device 100:5 is also adapted to send recorded data to a traffic information service 200 to be stored and accessible if necessary. Said traffic information service may be arranged as a cloud service 300. The fixed electronic sensor device 100:5 may be using a radio connection (via Radio Access System 20) or a fixed (optical and/or electric) connection via the Internet 30 to said traffic information service 200. The vehicle located electronic sensor devices 100:1, 100:2, 100:3 are also adapted to communicate their recorded data at certain time periods to one or more vehicle service sites (not shown) when triggered from said one or more sites. Said communication between one vehicle located electronic sensor device 100, and the vehicle service site is performed over internet and a Radio Access System 20 with one or more RBSs.

In FIG. 1 is a road-crossing illustrated and three vehicles of which one is turning left in front of one of the other vehicle coming from the right, which manoeuvre causes a collision between the two vehicles. A third vehicle is able to stop before hitting the two vehicles. The electronic sensors at the location of the traffic accident and in its surrounding area, i.e. the road-crossing, are adapted to continuously collect data information and at the time for a traffic accident collect traffic accident data and send it to a traffic information service.

Figure 2:
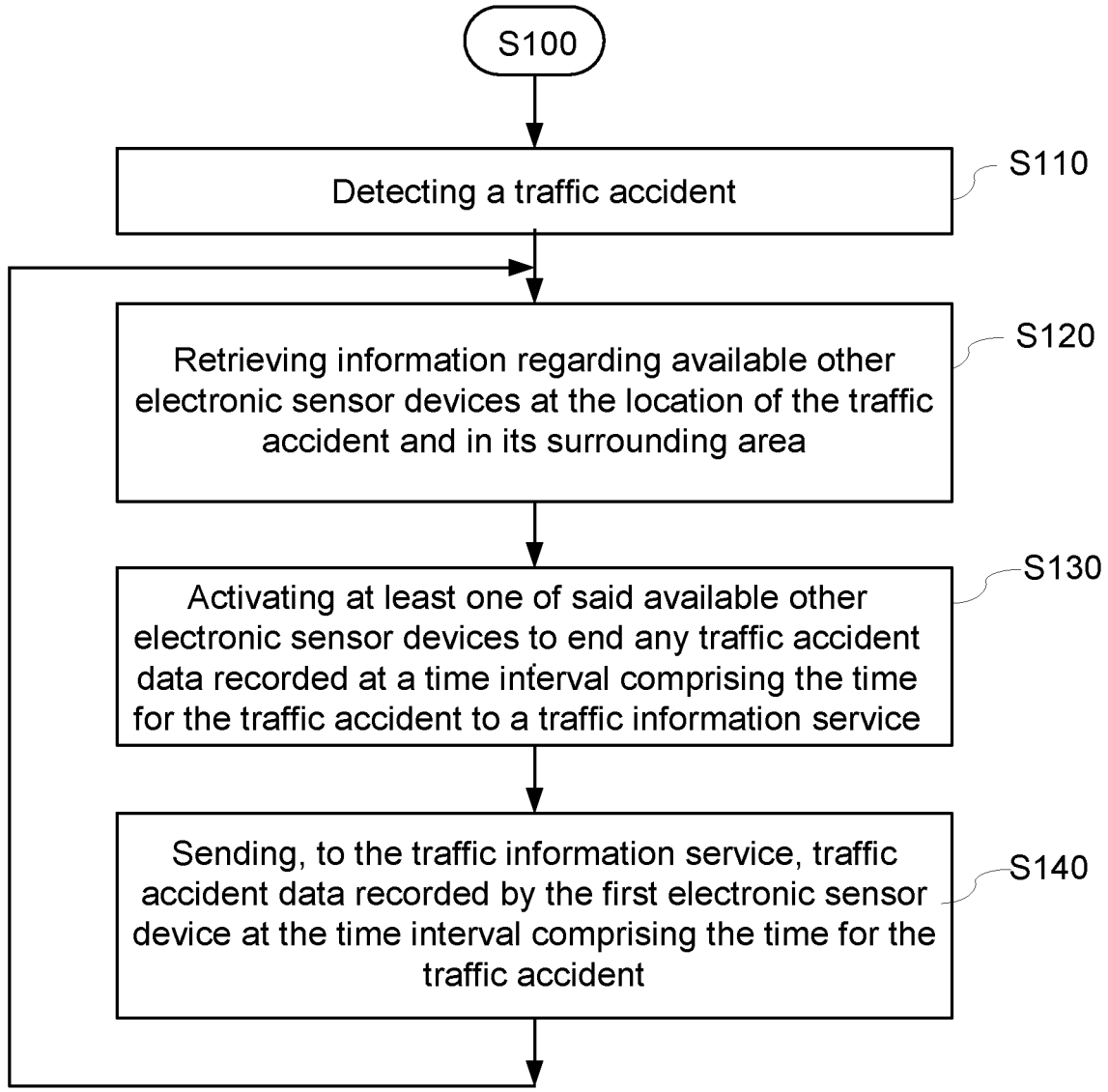
FIG. 2 is flowchart of a first method in an electronic sensor device.

FIG. 2 is flowchart of a first method S100. The method S100 further comprises the steps of:

According to the first method in one of the electronic sensor devices, herein denoted as a first electronic sensor device 100, following steps will be performed:
S110:—Detecting a traffic accident;
S120:—Retrieving information regarding available other electronic sensor devices (100:2, 100:3, 100:4, 100:5) at the location of the traffic accident and in its surrounding area;
S130:—Activating at least one of said available other electronic sensor devices to send any traffic accident data recorded at a time interval comprising the time for the traffic accident to a traffic information service;
S140:—Sending, to the traffic information service, traffic accident data recorded by the first electronic sensor device (ESD) at the time interval comprising the time for the traffic accident.

The sending of traffic accident data may be performed by establishing an e-call to the traffic information service. The e-call is an automatic, event triggered call service providing a link for sending traffic accident data to a certain service, such as a traffic information service.

Figure 3:
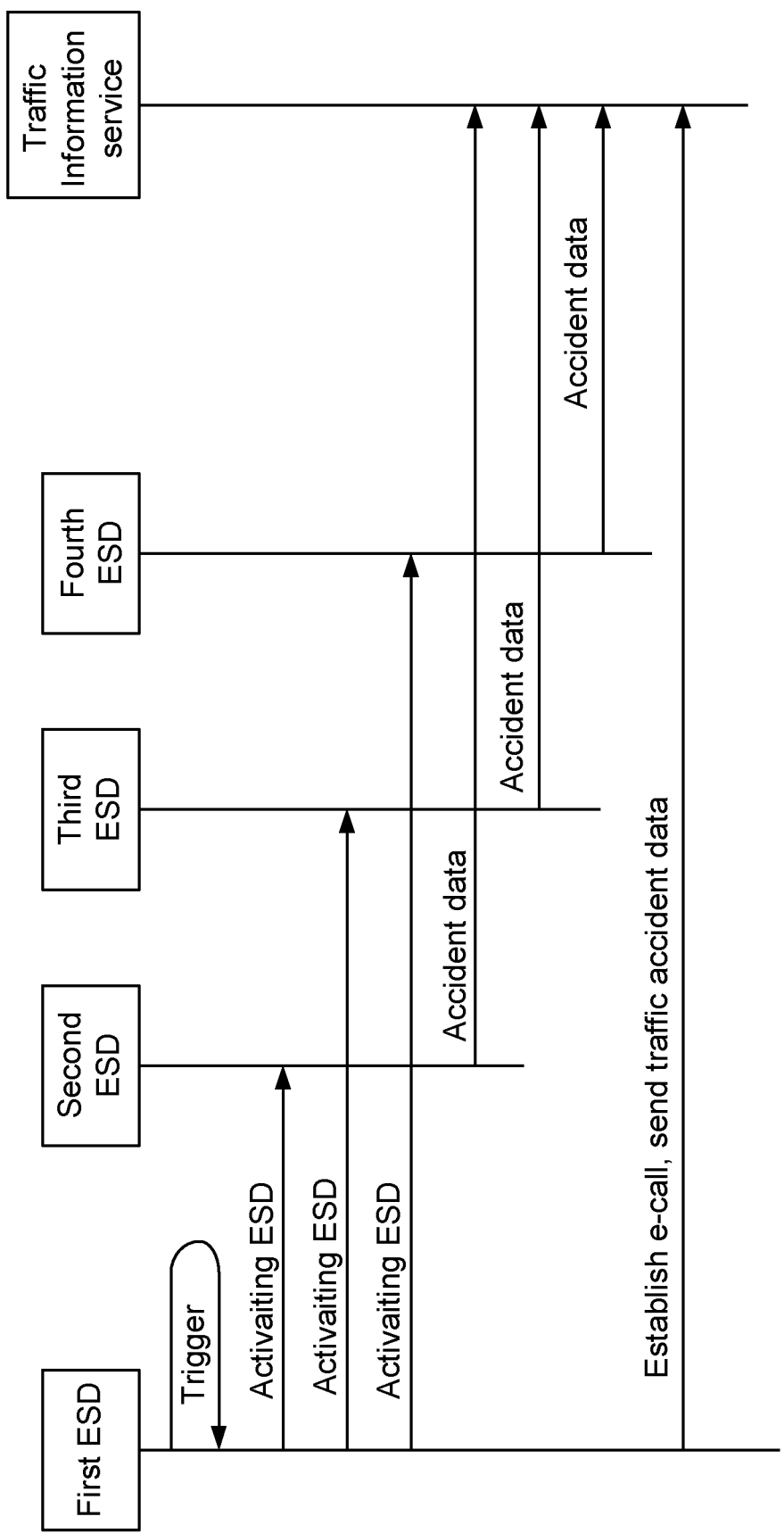
FIG. 3 is a signalling scheme in a system operating according the method in an electronic sensor device.

In FIG. 3, is an example of a signalling scheme in a system involving four electronic sensor devices denoted first, second, third and fourth ESD. The system comprises also a traffic information service. Thus, the first ESD is triggered in a first step, S110, when a traffic accident has happened. Said trigger may be an internal trigger or an external trigger. For the first ESD it is an internal trigger. The internal trigger may be a trigger signal from one of the sensors that is connected to the first electronic sensor device. The first ESD retrieves information, in step S120, regarding available other electronic sensor devices at the location of the traffic accident and in its surrounding area, as an internal trigger has been received. It uses the retrieved information regarding available other electronic sensor devices, in this case second, third and fourth ESDs. In step S130, it activates at least one of said available other ESDs to send any traffic accident data recorded at a time interval comprising the time for the traffic accident to a traffic information service. The first ESD acquires traffic accident data recorded at a time interval comprising the time for the traffic accident from available electronic sensor devices. In step S140, first ESD sends to the traffic information service traffic accident data recorded by the first electronic sensor device at the time interval comprising the time for the traffic accident. The sending of traffic accident data may be performed by establishing an e-call to the traffic information service.

The second, third and fourth ESDs are all activated by the first ESD. The activation is an external trigger, and the external trigger may be a trigger signal from one of the sensors that is connected to another electronic sensor device. The activated ESDs performs step S140 as described above.

When an electronic sensor device has detected a trigger, it is adapted to retrieve information regarding available other electronic sensor devices 100:2, 100:3, 100:4, 100:5 at the location of the traffic accident and in its surrounding area in step S120. The information regarding available electronic sensor devices at the location of the traffic accident and its surrounding area is retrieved from an electronic storage connected to or accessible from the electronic sensor device. When the information is received, the first electronic sensor device is adapted to activate at least one of said available other electronic sensor devices to send any traffic accident data recorded at a time interval comprising the time for the traffic accident to a traffic information service.

A Resource Directory (RD) such as the CoRE Resource Directory can be used for the purposes of discovering and uniquely identifying the individual assets, e.g. a vehicle, the vehicle's sensors and also sensors deployed in the road infrastructure, mobile user equipments (mobile terminals, mobile phones, smart phones, etc.). Said assets are used for the collection and actuation of the collection of data.

The RD is essentially a server where different devices register themselves in order to simplify the discovery process. Upon registration—this process can either occur for example when the board that hosts the sensor is powered up or when re-registration is needed for any reason such as a connection failure—an HTTP POST request is made which describes the different sensors available in the board. An example of such HTTP POST is the following:
Req: POST
coap://www.ericsson.com/rd?ep=vehicle_chassis_number
Payload:
</sensors/engine_temp>;ct=41;rt="temperature-c"; if="sensor",
</sensors/gasoline_level>ct=41; rt="gauge"; if="sensor"

Alternative formats such as JSON or XML can be used for the purposes of representing the different properties of the sensor (asset in the general case) that is registered.

What is noteworthy here is the contextual information that is associated with each sensor, in particular in this simple example the type of sensor. This information is useful for the purposes of this invention since it will be used later on for two reasons:
1. For filtering the information that is compiled in the scene of the accident or incident. In the general case, this contextual information can be extended with additional key value pairs to record more properties.
2. For collecting on demand only the information that is of relevance, i.e. retrieving only temperature information from the incident scene The location of the asset can be also registered and updated using the same mechanism. In the case of updating an asset's location an HTTP PUT request such as the following can be used:
Req: PUT
coap://www.ericsson.com/rd?ep=vehicle_chassis_number/
location=49%2C6%2F53%2C2
(In this case latitude=49.6 and longitude=53.2 expressed in URL encoded form).

This update request can be made several times in order to keep track of an asset's location. To avoid flooding, the network with frequent update requests a certain frequency or other rules can be set (i.e. only report the location when the vehicle is within certain geographical co-ordinates (geofencing technique).

The above presented reference mechanism for registering different assets along with their characteristics and their location, and in the following sections it will be described with detailing how the proposed technique works when an incident takes place.

Thus, in the previous section it is described how assets can register, record and update their properties in the RD. For the purposes of simplicity, it is assumed that all assets within a certain geographical area are registered in the same RD. This means that when a vehicle that is involved in a collision wants to retrieve all data from the vicinity of the incident. It can do so by interacting with only one RD. In the general case, more than on RDs can be used, therefore several requests need to be made.

A secondary assumption is that all assets already have a functioning relationship with an RD—that is they are already registered and they are constantly updating their information (i.e. their location if they are not stationary).

A tertiary assumption in the following description is the usage of the Constrained Application Protocol (CoAP). This is done since CoAP is designed for Machine-to-Machine (M2M) communications and it has a well-defined relationship with the construct of a Resource Directory. In the general case any protocol can be used to describe this particular interaction, e.g. MQ Telemetry Transport (MQTT) protocol.

Figure 4:
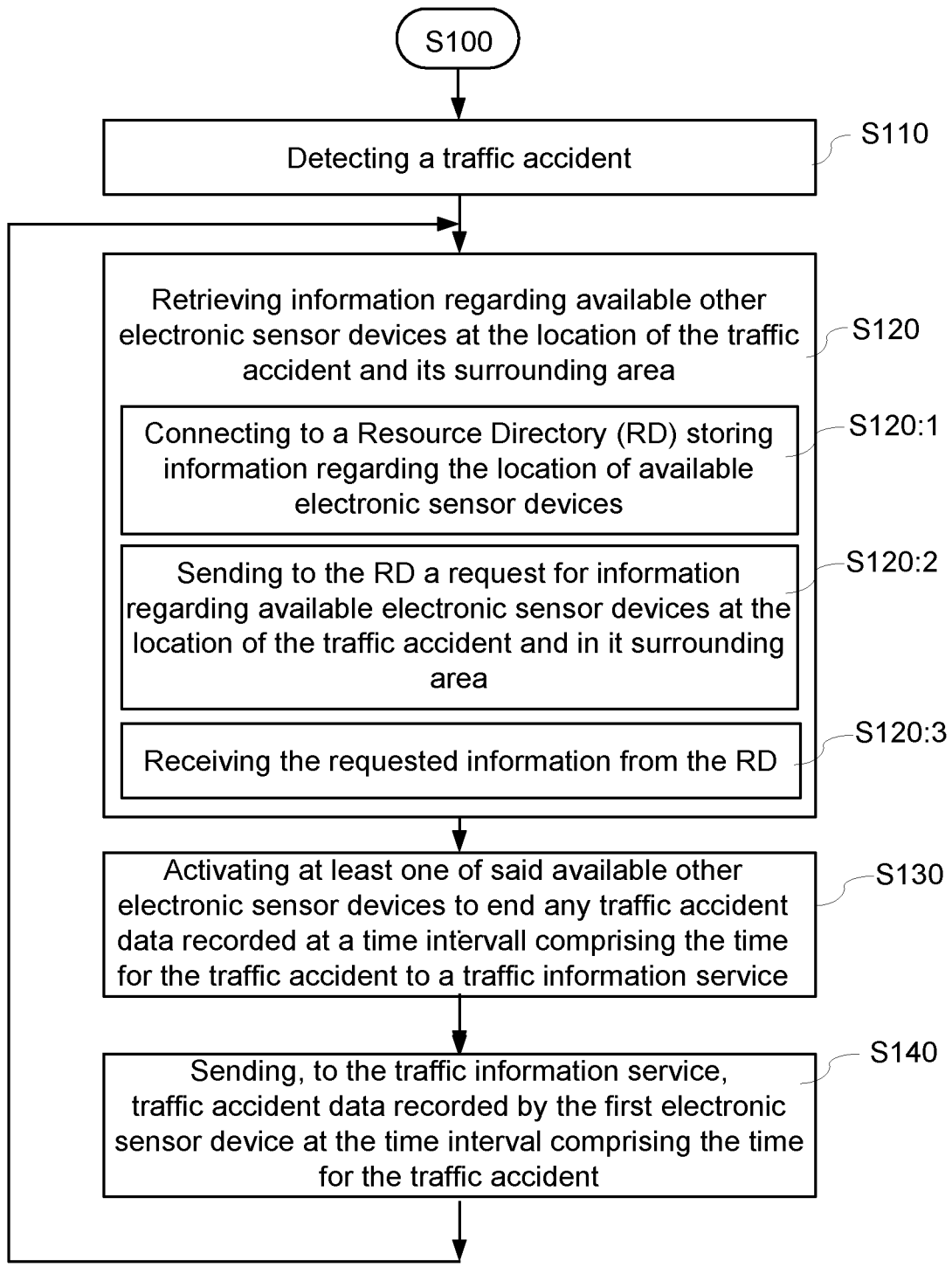
FIG. 4 is a flowchart of a first embodiment of the method in an electronic sensor device.

FIG. 4 is a flowchart of a first embodiment of the first method S100. In the first embodiment, the retrieving of information, S120, regarding available other electronic sensor devices (100:2, 100:3, 100:4, 100:5) at the location of the traffic accident and in its surrounding area comprises:
S120:1:—Connecting to a Resource Directory, RD, storing information regarding the location of available electronic sensor devices;
S120:2:—Sending to the RD a request for information regarding available electronic sensor device at the location of the traffic accident and in it surrounding area;
S120:3:—Receiving the requested information from the RD.

In a first step, step S120:1, the RD's IP address and port number are needed. A resource directory's IP address and port number can be discovered either by using an anycast address, a DHCP server or by using the CoRE Link Format (REF).

In a second step, the resources from the RD is requested and received, according to steps S120:2 and S120:3.

This can be done by sending an HTTP GET request to the RD such as the following:
Req: GET/rd-lookup/res?rt=*

The result of this request is a list of 1 ... N addresses (N may be a natural number greater than 1) where each one identifies the individual asset:
i.e. <coap://node1/temp>;rt="temperature"

In the previous request the start ("*") character was used for the purposes of retrieving all available assets. However, several criteria can be used, e.g. rt=temperature to retrieve all sensors related to temperature or rt=video to detect all sensors that can record imagery data.

The traffic accident data is recorded at a time interval comprising the time for the traffic accident by available electronic sensor devices is acquired. To retrieve information from each asset (ESD), a new request has to be made for each asset, i.e. ESD.
Req: GET<coap://node1/temp>

Figure 5:
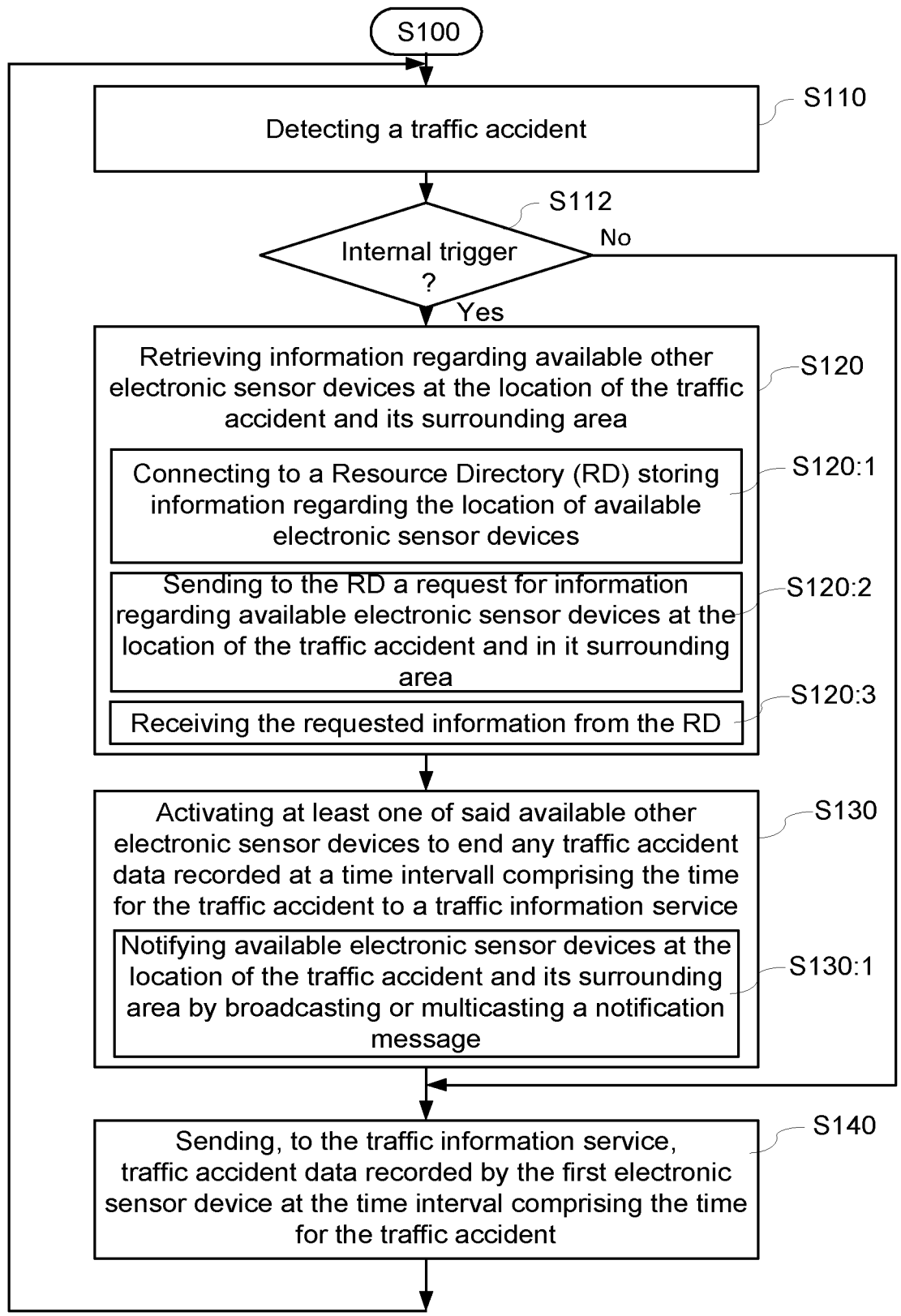
FIG. 5 is a flowchart of a second embodiment of the method in an electronic sensor device.

FIG. 5 is a flowchart of a second embodiment of the method S100. Step S110 may involve a selection step:
S112:—Internal trigger received? If an internal trigger is received, yes, then the method proceeds with step S120. If an external trigger is received instead of an internal trigger, no, then the method continues with step S140.

The second embodiment may further comprise, in the activating step S130:

S130:1:—Notifying available electronic sensor devices at the location of the traffic accident and its surrounding area by broadcasting or multicasting a notification message.

The broadcasting or multicasting is performed by means of radio technology. Said notification message may, according to one embodiment, comprise a unique identifier which identifies the first electronic sensor device 100, and the time when the traffic accident was detected.

The traffic accident data is encrypted before it is sent to the traffic information service.

The method is finalized wherein traffic accident data recorded at a time interval comprising the time for the traffic accident, and the sending of the traffic accident data to the traffic information service, in step S140. The traffic information service 200 is according to the above described method S100 quite passive and the service 200 is adapted to receive, organize and store any traffic accident data recorded at the time interval comprising the time for the traffic accident.

According to an alternative second method S200, the traffic information service 200 is more involved in the collecting of the traffic accident data.

Figure 6:
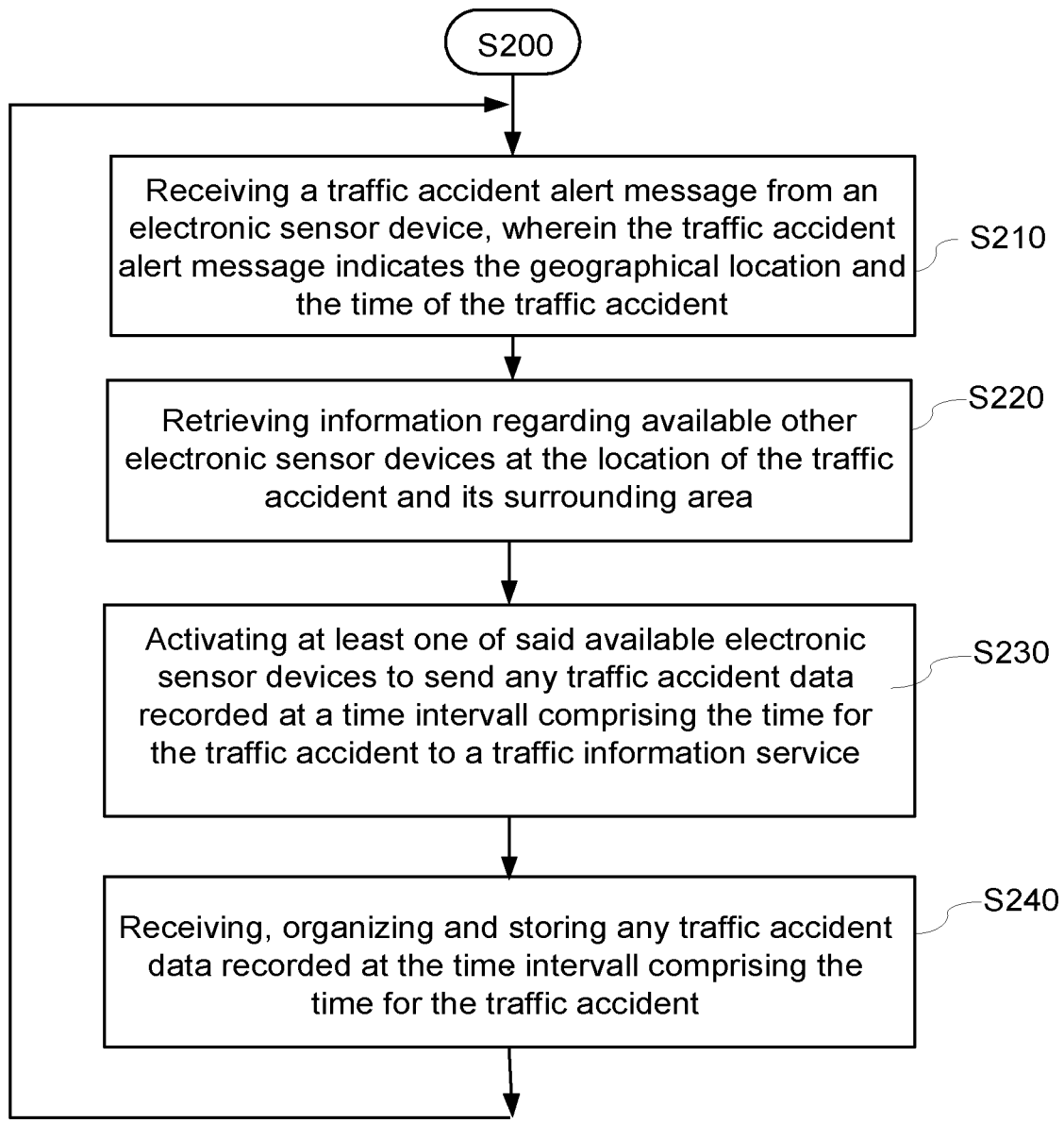
FIG. 6 is flowchart of a second method performed by a traffic information service.

FIG. 6 is flowchart of the second method by a traffic information service.

The second method S200 is performed by a traffic information service 200, which may either be located in the cloud 300 as a cloud service, or in a traffic information service site 300. The method S200 is adapted for collecting information related to traffic accidents involving at least one vehicle 10:1, 10:2, 10:3. The method comprises:

S210:—Receiving a traffic accident alert message from an electronic sensor device (100, 100:2, 100:3, 100:4) wherein the traffic accident alert message indicates the geographical location and the time of the traffic accident;

S220:—Retrieving information regarding available electronic sensor devices (100:1, 100:2, 100:3, 100:4) at the location of the traffic accident and its surrounding area;

S230:—Activating at least one of said available electronic sensor devices to send any traffic accident data recorded at a time interval comprising the time for the traffic accident to the traffic information service;

S240:—Receiving, organizing and storing any traffic accident data recorded at the time interval comprising the time for the traffic accident.

The method is explained with reference to FIG. 7.

Figure 7:
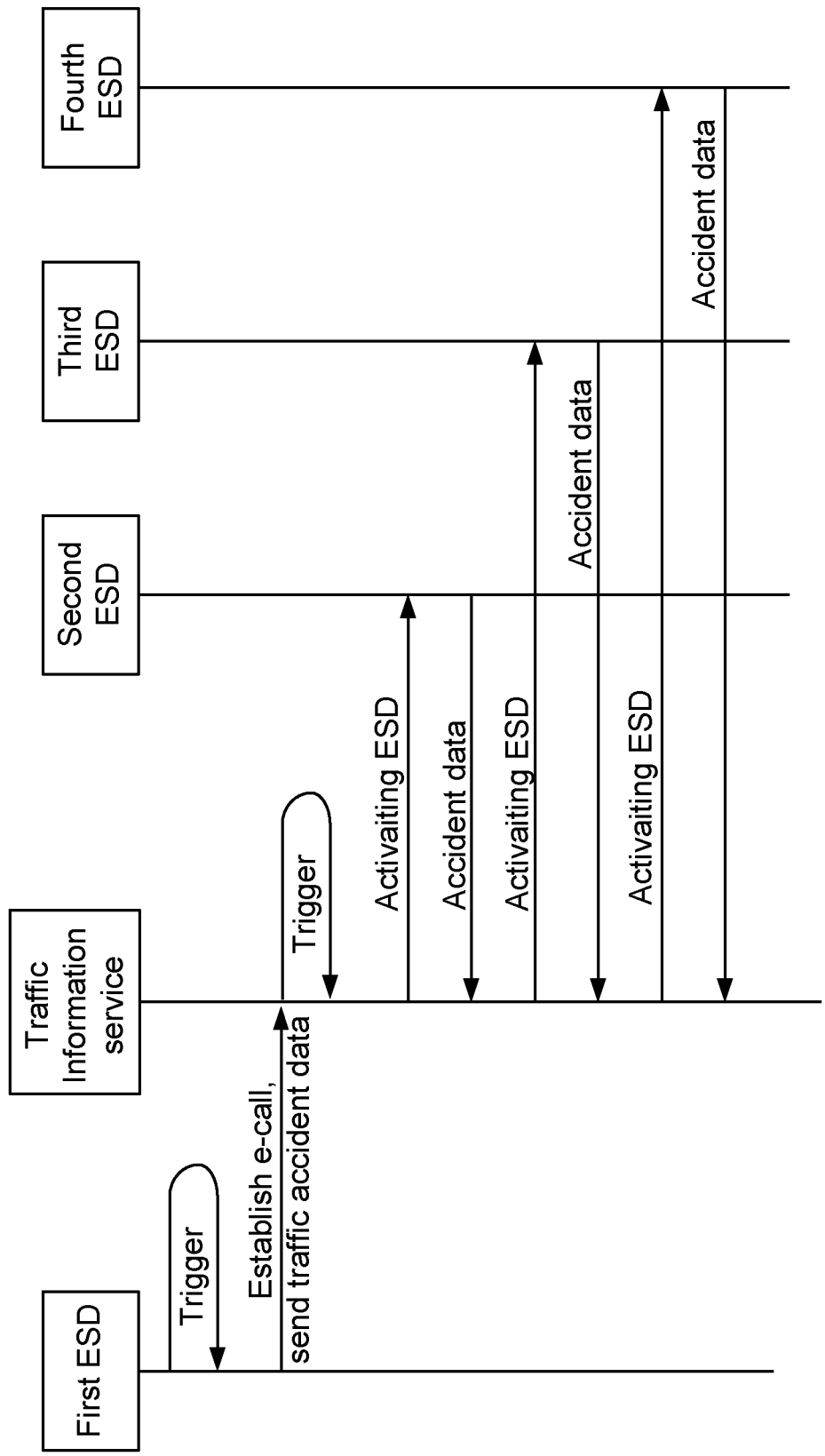
FIG. 7 is a signalling scheme in a system operating according the method performed by a traffic information service.

In FIG. 7, is an example of a signalling scheme in a system involving the traffic information service and four electronic sensor devices denoted first, second, third and fourth ESD. Thus, the first ESD is triggered in a first step, S110, when a traffic accident has happened an internal trigger is generated. The internal trigger may be a trigger signal from one of the sensors that is connected to the first electronic sensor device. The first ESD is adapted to establish a connection to the traffic information service. Said connection may be established via an eCall. The first ESD is further adapted to send traffic accident data/information to the traffic information service. The traffic information service is triggered to perform step S220 by retrieving information regarding available electronic sensor devices (100:1, 100:2, 100:3, 100:4) at the location of the traffic accident and its surrounding area, and step S230 by activating at least one of said available electronic sensor devices to send any traffic accident data recorded at a time interval comprising the time for the traffic accident to the traffic information service. In this case the second, third and fourth ESDs are activated and said ESDs then acquires traffic accident data recorded at a time interval comprising the time for the traffic accident, and step S140 by sending the traffic accident data to the traffic information service. The sending of traffic accident data may be performed by establishing an e-call to the traffic information service. The traffic information service is adapted to perform step S240 by receiving, organizing and storing any traffic accident data recorded at the time interval comprising the time for the traffic accident.

In the first step, S210, is performed when an electronic sensor device has generated and sent a traffic accident alert message, e.g. an eCall, due to a traffic accident to a traffic information service address or phone number, which is stored in the electronic sensor device 100. The message indicates the geographical location and the time of the traffic accident. The traffic information service 200 is adapted in step S220 to retrieve information regarding available electronic sensor devices 100:1, 100:2, 100:3, 100:4, 100:5 at the location of the traffic accident and its surrounding area from an electronic storage connected to the service 200 or accessible from the Resource Directory, RD, 40 storing information regarding the location of available electronic sensor devices. The traffic information service 200 uses the geographical location and the time of the traffic accident received in the alert message.

When the traffic information service 200 has the necessary information which electronic sensor devices that are available and that may have any traffic accident information about the traffic accident in question, the traffic information service 200 is adapted to activate, in step S230, at least one of said available electronic sensor devices 100 to send any traffic accident data recorded at a time interval comprising the time for the traffic accident to the traffic information service. Each electronic sensor device 100 that receives an external trigger is adapted to acquire traffic accident data recorded at a time interval comprising the time for the traffic accident, and to send the traffic accident data to the traffic information service, which receives, organizes and stores any traffic accident data recorded at the time interval comprising the time for the traffic accident.

Figure 8:
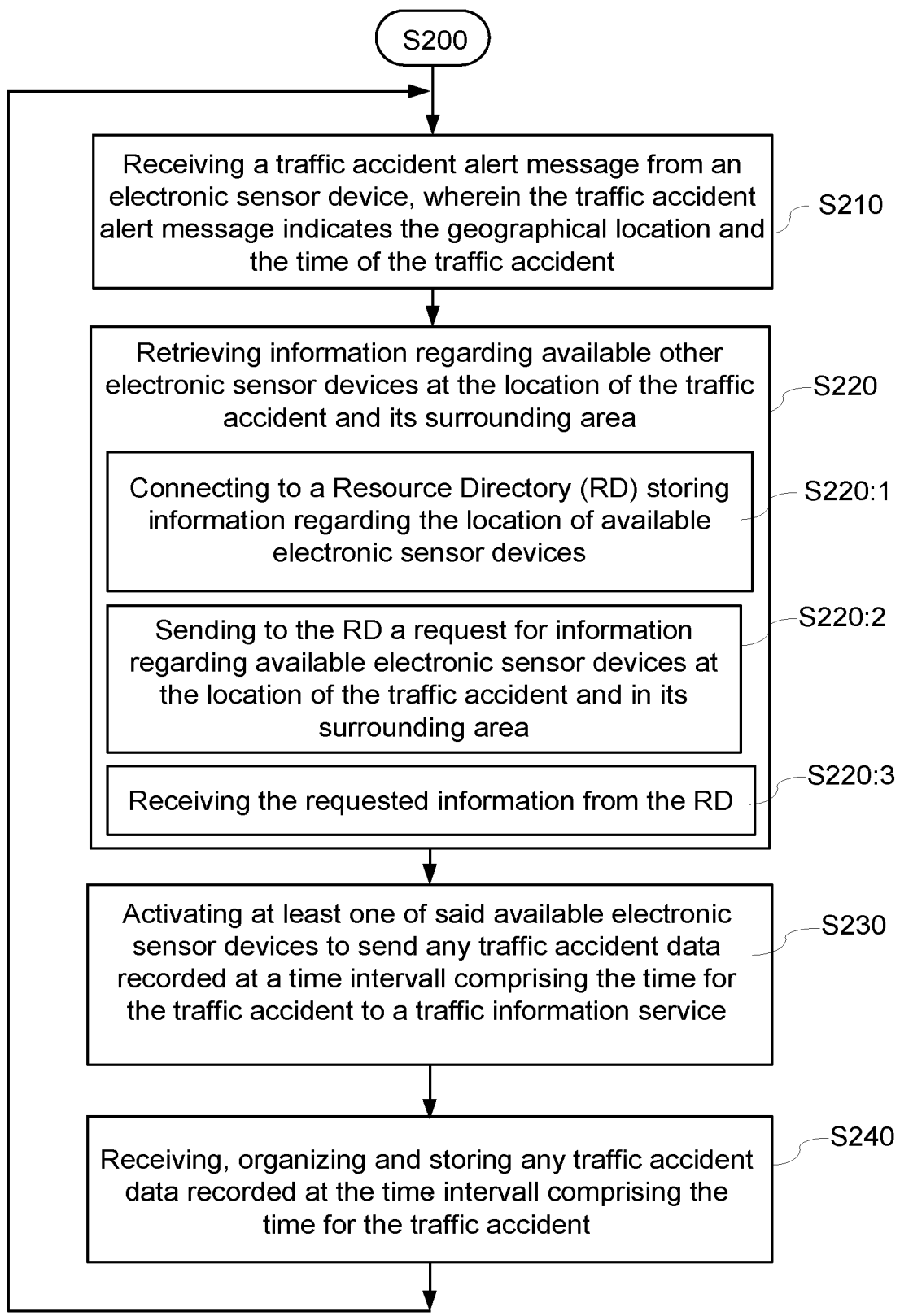
FIG. 8 is flowchart of a first embodiment of method performed by a traffic information service.

FIG. 8 is flowchart of a first embodiment of method performed by a traffic information service. According to one embodiment of the method, the retrieving step S220 comprises following steps:

S220:1:—Connecting to a Resource Directory, RD, 40 storing information regarding the location of available electronic sensor devices;

S220:2:—Sending to the RD a request for information regarding available electronic sensor device at the location of the traffic accident and in it surrounding area;

S220:3:—Receiving the requested information from the RD.

In a first step, step S220:1, the RD's IP address and port number are needed. A resource directory's IP address and port number can be discovered either by using an anycast address, a DHCP server or by using the CoRE Link Format (REF).

In a second step, the resources from the RD is requested and received, according to steps S220:2 and S220:3.

Figure 9:
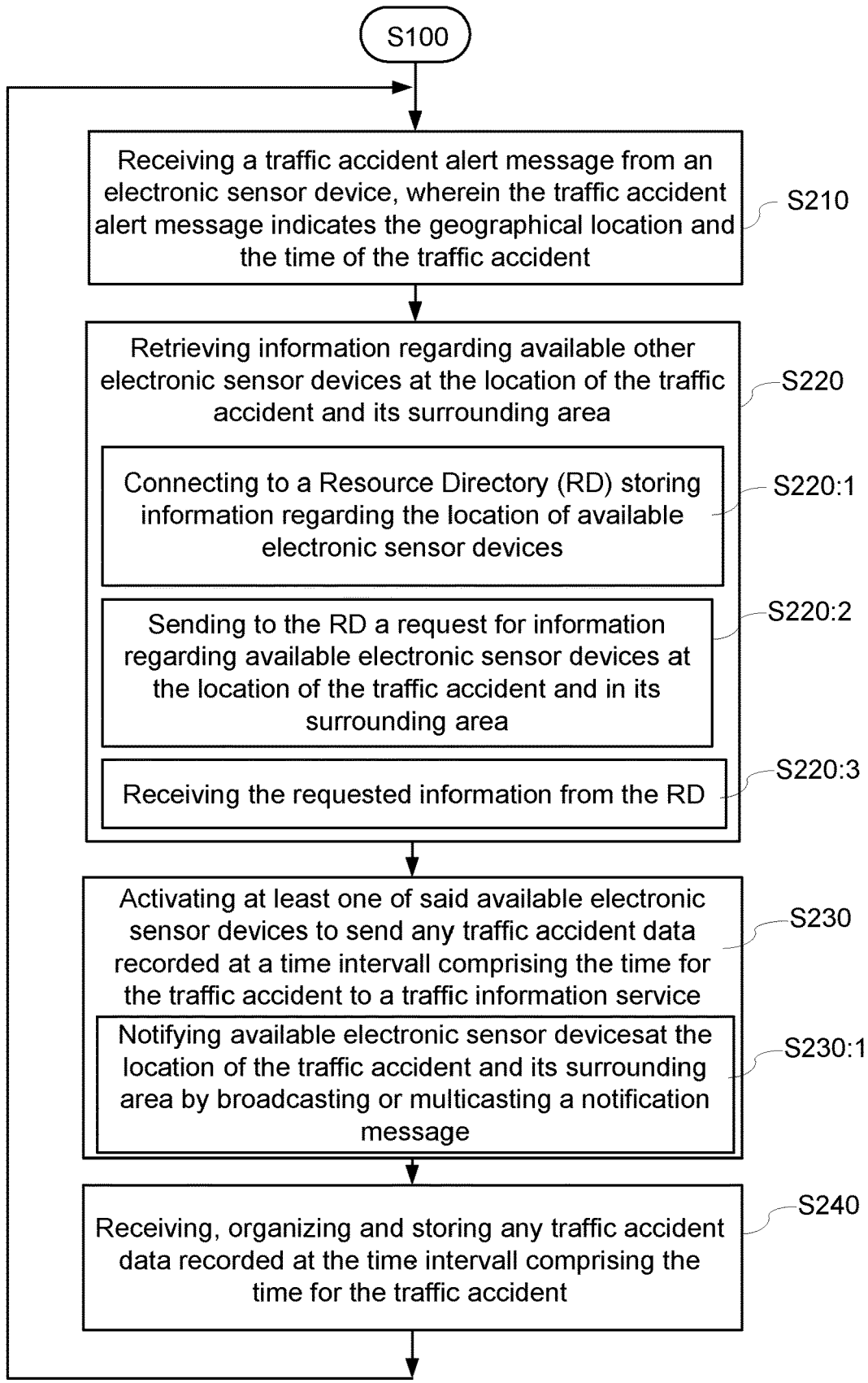
FIG. 9 is flowchart of another embodiment of the method performed by the traffic information service.

FIG. 9 is flowchart of an embodiment of the method performed by the traffic information service.

According to further one embodiment of the method, the activating step S230 further comprises:

S230:1:—Notifying available electronic sensor devices at the location of the traffic accident and its surrounding area by broadcasting or multicasting a notification message.

The broadcasting or multicasting is performed by means of radio technology. Said notification message may, according to one embodiment, comprise a unique identifier which identifies the first electronic sensor device 100, and the time when the traffic accident was detected.

The notification message comprises a unique identifier which identifies the sender 100:1, 100:2, 100:3, 100:4 and the time when the accident was detected.

The electronic sensor devices comprise at least one of a data recording device 100:4, a temperature sensor 100,100:3, a traffic sensor (100:3), and a vehicle performance sensor 100, 100:2.

The accident data sent to the traffic information service 200 is vehicle dynamic information and/or contextual information.

The traffic accident data may be encrypted.

Figure 10:
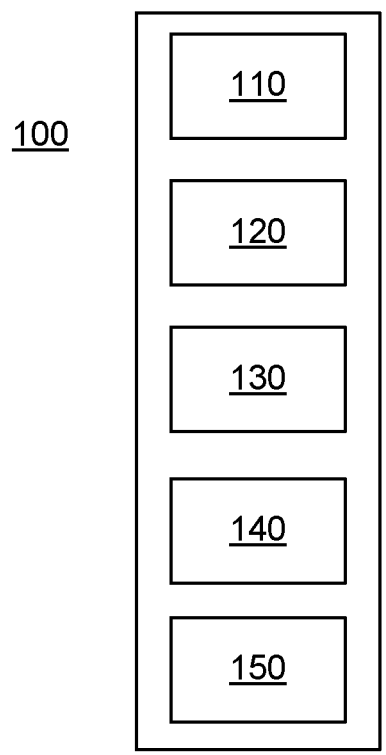
FIG. 10 is a block diagram illustrating a first electronic sensor device.

FIG. 10 is a block diagram illustrating a first electronic sensor device.

The first electronic sensor device 100 is adapted for collecting information related to traffic accidents involving at least one vehicle. Said device comprises a trigger unit 110, which is adapted to detect a traffic accident. The ESD may be triggered by receiving an internal or external trigger. The ESD 100 further comprises radio interface 120 adapted to retrieve information regarding available other electronic sensor devices 100:2, 100:3, 100:4 at the location of the traffic accident and in its surrounding area, if an internal trigger is received. An activator unit 130 is provided for activating at least one of said available other electronic sensor devices to send any traffic accident data recorded at a time interval comprising the time for the traffic accident to a traffic information service. The first electronic sensor device 100 may comprise one or more electronic sensors 150. Said one or more electronic sensors may be able to measure or detect different traffic accident data to be processed and/or delivered to a traffic accident service either automatically or on demand by triggers as described above. The first electronic sensor device 100 may therefore be provided with a collecting unit 140 adapted to acquire traffic accident data recorded at a time interval comprising the time for the traffic accident from said electronic sensors 150. The radio interface 120 is further adapted to send the traffic accident data to the traffic information service 200.

The trigger unit 110, activator unit 130 and collecting unit 140 may in some embodiments be implemented in digital electronically circuitry, or in computer hardware, firmware, software, or in combinations of them. Apparatus of the technique may be implemented in a computer program product tangibly embodied in a machine readable storage device for execution by a programmable processor; and method steps of the method may be performed by a programmable processor executing a program of instructions to perform functions of the technique by operating on input data and generating output.

Said technique may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Figure 11:
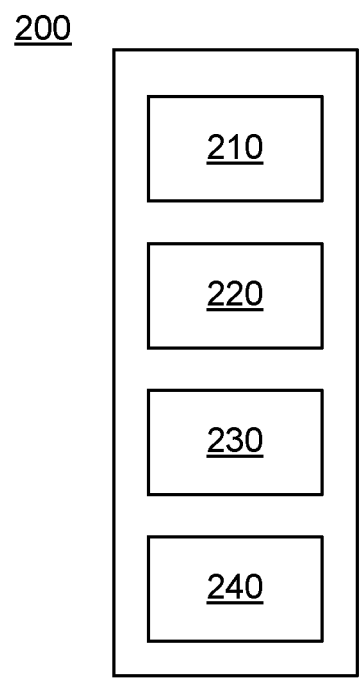
FIG. 11 is a block diagram illustrating a traffic information service node.

FIG. 11 is a block diagram illustrating a traffic information service node. The traffic information service node 200 for collecting information related to traffic accidents involving at least one vehicle 10:1, 10:2, 10:3, said node comprises an alert unit 210 adapted to receive a traffic accident alert message from an electronic sensor device 100:1, 100:2, 100:3, 100:4 wherein the traffic accident alert message indicates the geographical location and the time of the traffic accident. A reading unit 220 is further provided, which is adapted to retrieving information regarding available electronic sensor devices 100:1, 100:2, 100:3, 100:4 at the location of the traffic accident and its surrounding area. The traffic information service node 200 further comprises an activator unit 230 adapted to activate at least one of said available electronic sensor devices to send any traffic accident data recorded at a time interval comprising the time for the traffic accident to the traffic information service, and an accident data handler 240 that is adapted to receive, organize and store any traffic accident data recorded at a time interval comprising the time for the traffic accident.

The technique may be implemented in digital electronically circuitry, or in computer hardware, firmware, software, or in combinations of them. Apparatus of the technique may be implemented in a computer program product tangibly embodied in a machine readable storage device for execution by a programmable processor; and method steps of the method may be performed by a programmable processor executing a program of instructions to perform functions of the technique by operating on input data and generating output.

The technique may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially-designed ASICs (Application Specific Integrated Circuits).

Figure 12:
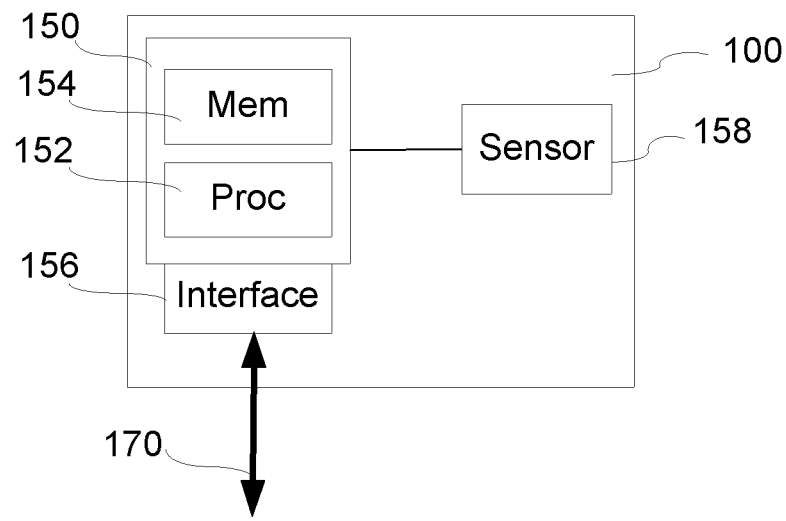
FIG. 12 is further one block diagram illustrating an embodiment of a first electronic sensor device.

FIG. 12 is further one embodiment of a first electronic sensor device.

The device comprises a processing circuitry 150 constituting a controller of the device. The processing circuitry 150 comprises a processor 152 and a memory 154. The memory 154 is containing instructions executable by said processor 150. The device further comprises an interface 156 enabling wireless communication 170 with other electronic devices and nearby RBSs of the Radio Access System (20 in FIG. 1). It may further comprise one or more electronic sensors 158. Said one or more electronic sensors may be able to measure or detect different traffic accident data to be processed and/or delivered to a traffic accident service either automatically or on demand by triggers as described above.

According to one embodiment, the processing circuitry 150 is operative to perform steps of the method S100, i.e.:

Detecting a traffic accident;

Retrieving information regarding available other electronic sensor devices at the location of the traffic accident and in its surrounding area;

Activating at least one of said available other electronic sensor devices to send any traffic accident data recorded at a time interval comprising the time for the traffic accident to a traffic information service;

Sending, to the traffic information service (200), traffic accident data recorded by the first electronic sensor device at the time interval comprising the time for the traffic accident.

According to one embodiment, said first electronic sensor device 100:1 is located in a vehicle 10 or in a road surveillance device 100:3.

According to further embodiments, the information regarding available electronic sensor devices at the location of the traffic accident and its surrounding area is retrieved from an electronic storage connected to or accessible from the electronic sensor device.

According to further embodiments, the processor may further be adapted to connect a Resource Directory, RD, 40 storing information regarding the location of available electronic sensor devices, to send to the RD a request for information regarding available electronic sensor device at the location of the traffic accident and in it surrounding area, and to receive the requested information from the RD.

According to further embodiments of the first electronic sensor device, wherein the processor 152 is adapted to notify available electronic sensor devices at the location of the traffic accident and its surrounding area by broadcasting or multicasting a notification message.

The notification message may comprise a unique identifier which identifies the first electronic sensor device 100, and the time when the traffic accident was detected.

The broadcasting or multicasting may be performed by means of radio technology.

The method according to any of the preceding claims, wherein said electronic sensor devices comprise at least one of a data recording device, a temperature sensor, a traffic sensor, and a vehicle performance sensor.

According to further embodiments, the traffic accident data sent to the traffic information service may be vehicle dynamic information and/or contextual information.

In further embodiments, the traffic information service may be a cloud service.

According to further embodiments, the traffic accident data is encrypted before it is sent to the traffic information service.

It is further provided a computer program comprising computer program code which, when run in a processor circuitry 150 of a first electronic sensor device 100, causes the first electronic sensor device to perform the steps of the first method S100.

It is further provided a computer program product comprising a computer program and a computer readable means 154 on which the computer program is stored. Said computer program comprises computer program code which, when run in a processor circuitry 150 of a first electronic sensor device 100, causes the first electronic sensor device to perform the steps of the first method S100.

It is also provided a carrier containing the computer program, wherein the carrier is one of an electronic signal, optical signal, radio signal or computer readable storage medium 154. Said computer program comprises computer program code which, when run in a processor circuitry 150 of a first electronic sensor device 100, causes the first electronic sensor device to perform the steps of the first method S100.

Figure 13:
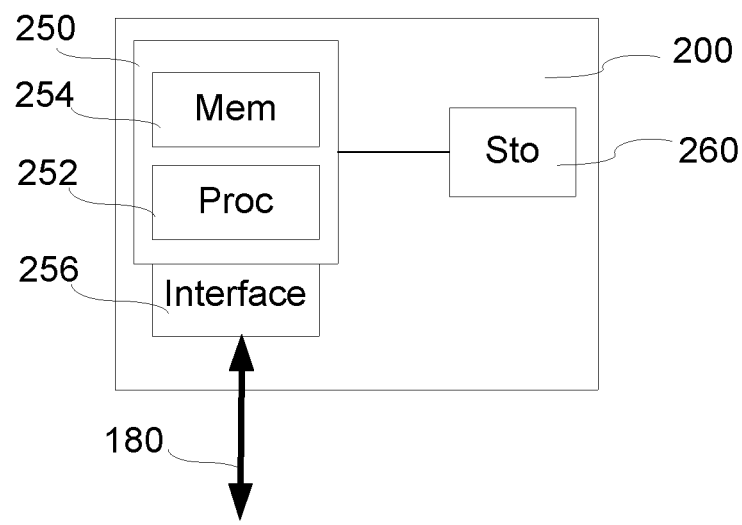
FIG. 13 is one additional block diagram illustrating an embodiment of a traffic information service node.

FIG. 13 is further one embodiment of a traffic information service 200. The service may be implemented as a node in the internet or a virtual node in a cloud. The traffic information service comprises a processing circuitry 250 constituting a controller of the node or service. The processing circuitry 250 comprises a processor 252 and a memory 254. The memory 254 is containing instructions executable by said processor 250. The device further comprises an interface 256 enabling data packet communication 180 by receiving and sending data packets. It may further comprise one or more memory storages 260 for storing received data information, e.g. traffic accident data.

According to one embodiment, the processing circuitry 250 is operative to perform steps of the method S200, i.e.:

Receiving a traffic accident alert message from an electronic sensor device wherein the traffic accident alert message indicates the geographical location and the time of the traffic accident;

Retrieving information regarding available electronic sensor devices at the location of the traffic accident and its surrounding area;

Activating at least one of said available electronic sensor devices to send any traffic accident data recorded at a time interval comprising the time for the traffic accident to the traffic information service;

Receiving, organizing and storing any traffic accident data recorded at the time interval comprising the time for the traffic accident.

According to one embodiment, the information regarding available electronic sensor devices at the location of the traffic accident and its surrounding area is retrieved from an electronic storage connected to or accessible from the electronic sensor device.

According to further embodiments, the processor 252 is adapted to connect to a Resource Directory, RD, 40 storing information regarding the location of available electronic sensor devices, to send to the RD a request for information regarding available electronic sensor device at the location of the traffic accident and in it surrounding area, and to receive the requested information from the RD.

According to further embodiments, the processor 252 is adapted to notify available electronic sensor devices at the location of the traffic accident and its surrounding area by broadcasting or multicasting a notification message.

According to further embodiments, the notification message comprises a unique identifier which identifies the sender 100(:1), 100:2, 100:3, 100:4, 100:5, and the time when the accident was detected.

According to further embodiments, said electronic sensor devices may comprise at least one of a data recording device 100:4, a temperature sensor 100,100:3, a traffic sensor 100:5, and a vehicle performance sensor 100, 100:2.

According to further embodiments, the accident data sent to the traffic information service 200 may be vehicle dynamic information and/or contextual information.

According to further embodiments, the traffic information service 200 may be a cloud service 300.

According to further embodiments, the traffic accident data 180 is encrypted.

It is further provided a computer program comprising computer program code which, when run in a processor circuitry 250 of a traffic service information node 200, causes the node to perform steps of the second method S200.

It is also provided a computer program product comprising a computer program and a computer readable means 254 on which the computer program is stored. Said computer program comprises computer program code which, when run in a processor circuitry 250 of a traffic service information node 200, causes the node to perform steps of the second method S200.

It is further provided a carrier containing a computer program, wherein the carrier is one of an electronic signal, optical signal, radio signal or computer readable storage medium 254. Said computer program comprises computer program code which, when run in a processor circuitry 250 of a traffic service information node 200, causes the node to perform steps of the second method S200.

A number of embodiments of the present technique have been described. It will be understood that various modifications may be made without departing from the scope of the technique

The invention claimed is:

1. A method for a first electronic sensor device of collecting information related to traffic accidents involving at least one vehicle, the method comprising:
   detecting a traffic accident;
   connecting to a Resource Directory, RD, the RD storing information regarding a location and characteristics of available electronic sensor devices that pre-registered, utilizing a Constrained Application Protocol (CoAP), with the RD during sensor power-up, the information regarding the location and the characteristics of the available electronic sensor devices being stored in the RD prior to the traffic accident, the characteristics of the available electronic sensor devices including a type of sensor;
   sending to the RD a request for information regarding available electronic sensor devices having at least one characteristic matching at least a predefined characteristic and being at a location of the traffic accident and in an area surrounding the traffic accident;
   receiving the requested information from the RD;
   activating at least one of the available other electronic sensor devices identified in the requested information from the RD to send any traffic accident data recorded at a time interval comprising the time for the traffic accident to a traffic information service; and
   sending, to the traffic information service, traffic accident data recorded by the first electronic sensor device at the time interval comprising a time for the traffic accident.

2. The method according to claim 1, wherein the first electronic sensor device is located in one of a vehicle and in a road surveillance device.

3. The method according to claim 1, wherein the activating further comprises:
   available electronic sensor devices at the location of the traffic accident and the area surrounding the traffic accident by one of broadcasting and multicasting a notification message.

4. The method according to claim 3, wherein the notification message comprises a unique identifier which identifies the first electronic sensor device, and the time when the traffic accident was detected.

5. The method according to claim 1, wherein the traffic information service is a cloud service.

6. The method according to claim 5, wherein the traffic accident data is encrypted before it the traffic accident data is sent to the traffic information service.

7. A method in a traffic information service for collecting information related to traffic accidents involving at least one vehicle, the method comprising:
   receiving a traffic accident alert message from an electronic sensor device wherein the traffic accident alert message indicates the geographical location and the time of the traffic accident;
   connecting to a Resource Directory, RD, the RD storing information regarding a location and characteristics of available electronic sensor devices that pre-registered, utilizing a Constrained Application Protocol (CoAP), with the RD during sensor power-up, the information regarding the location and the characteristics of the available electronic sensor devices being stored in the RD prior to the traffic accident, the characteristics of the available electronic sensor devices including a type of sensor;
   sending to the RD a request for information regarding available electronic sensor devices having at least one characteristic matching at least a predefined characteristic and being at a location of the traffic accident and in an area surrounding the traffic accident;
   receiving the requested information from the RD;
   activating at least one of the available electronic sensor devices identified in the requested information from the RD to send any traffic accident data recorded at a time interval comprising a time for the traffic accident to the traffic information service; and
   receiving, organizing and storing any traffic accident data recorded at the time interval comprising the time for the traffic accident.

8. The method according to claim 7, wherein the activating further comprises:
   notifying available electronic sensor devices at the location of the traffic accident and the area surrounding the traffic accident by one of broadcasting and multicasting a notification message.

9. The method according to claim 8, wherein the notification message comprises a unique identifier which identifies the sender and the time when the accident was detected.

10. The method according to claim 7, wherein the traffic accident data is encrypted.

11. A first electronic sensor device for collecting information related to traffic accidents involving at least one vehicle, the device comprising a processor in a processing circuitry configured to:
   detect a traffic accident;
   connect to a Resource Directory, RD, the RD storing information regarding a location and characteristics of available electronic sensor devices that pre-registered, utilizing a Constrained Application Protocol (CoAP), with the RD during sensor power-up, the information regarding the location and the characteristics of the available electronic sensor devices being stored in the RD prior to the traffic accident, the characteristics of the available electronic sensor devices including a type of sensor;
   send to the RD a request for information regarding available electronic sensor devices having at least one characteristic matching at least a predefined characteristic and being at a location of the traffic accident and in an area surrounding the traffic accident;
   receive the requested information from the RD;
   activate at least one of the available other electronic sensor devices identified in the requested information from the RD to send any traffic accident data recorded at a time interval comprising a time for the traffic accident to a traffic information service; and send, to the traffic information service, traffic accident data recorded by the first electronic sensor device at the time interval comprising the time for the traffic accident.

12. A traffic information service node for collecting information related to traffic accidents involving at least one vehicle, the node comprising a processor in a processing circuitry configured to:

receive a traffic accident alert message from an electronic sensor device wherein the traffic accident alert message indicates the geographical location and the time of the traffic accident;

connect to a Resource Directory, RD, the RD storing information regarding a location and characteristics of available electronic sensor devices that pre-registered, utilizing a Constrained Application Protocol (CoAP), with the RD during sensor power-up, the information regarding the location and the characteristics of the available electronic sensor devices being stored in the RD prior to the traffic accident, the characteristics of the available electronic sensor devices including a type of sensor;

send to the RD a request for information regarding available electronic sensor devices having at least one characteristic matching at least a predefined characteristic and being at a location of the traffic accident and in an area surrounding the traffic accident;

receive the requested information from the RD;

activate at least one of the available electronic sensor devices identified in the requested information from the RD to send any traffic accident data recorded at a time interval comprising a time for the traffic accident to the traffic information service; and receive, organize and store any traffic accident data recorded at the time interval comprising the time for the traffic accident.

13. The first electronic sensor device according to claim 11, wherein the activating further comprises:

notifying available electronic sensor devices at the location of the traffic accident and the area surrounding the traffic accident by one of broadcasting and multicasting a notification message.

14. The traffic information service node according to claim 12, wherein the activating further comprises:

notifying available electronic sensor devices at the location of the traffic accident and the area surrounding the traffic accident by one of broadcasting and multicasting a notification message.

* * * * *